Sept. 15, 1970     L. D. BARRY     3,528,569
UNIT LOAD HOLD-DOWN AND RELEASING LIFT
Filed May 22, 1967     3 Sheets-Sheet 1
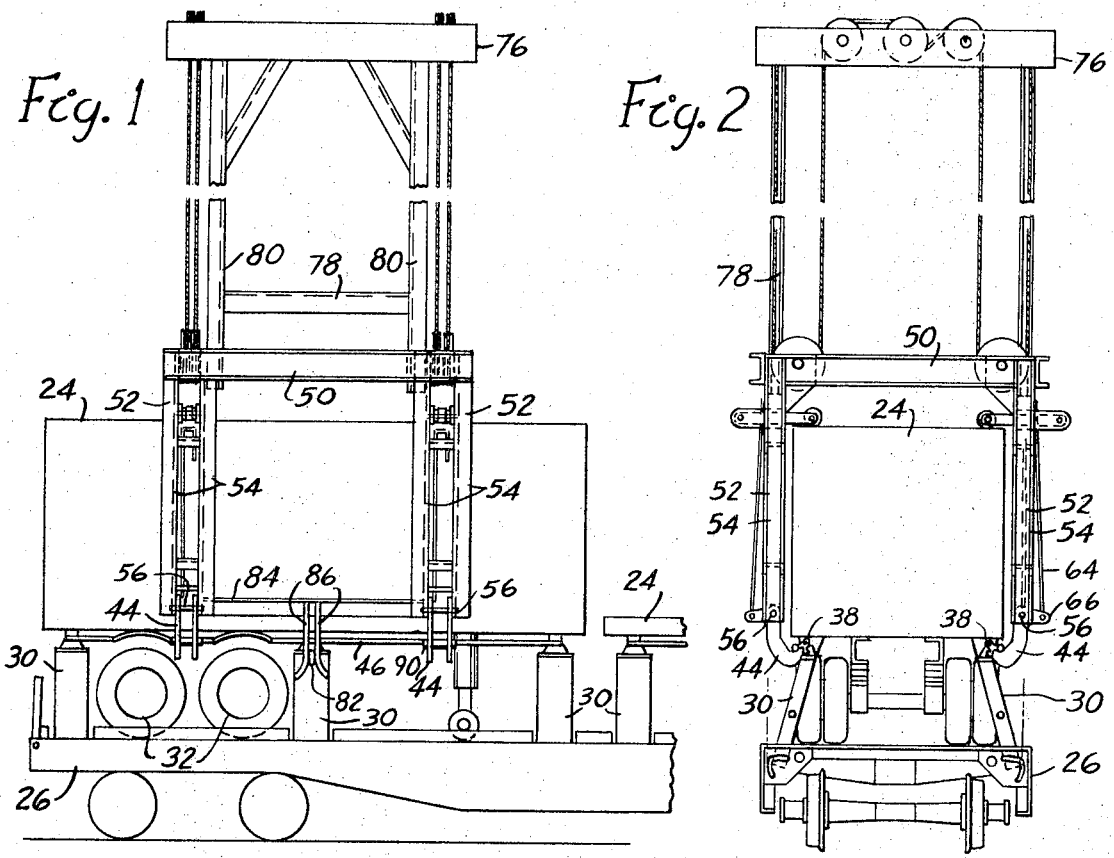
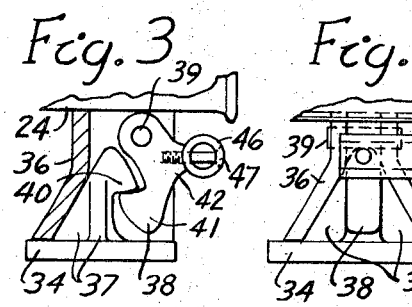
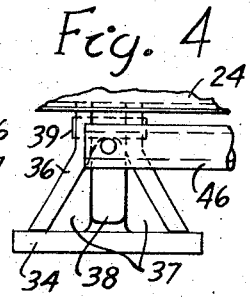
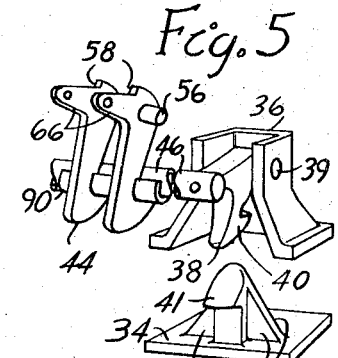
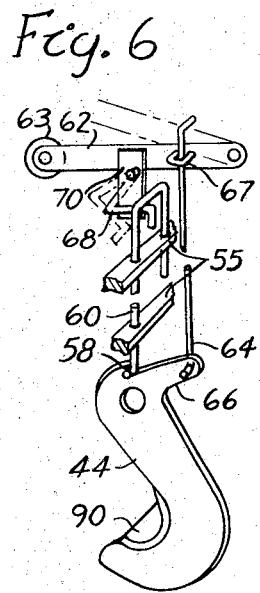
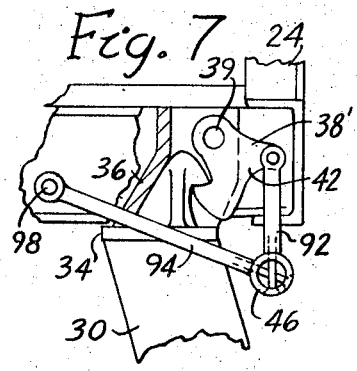
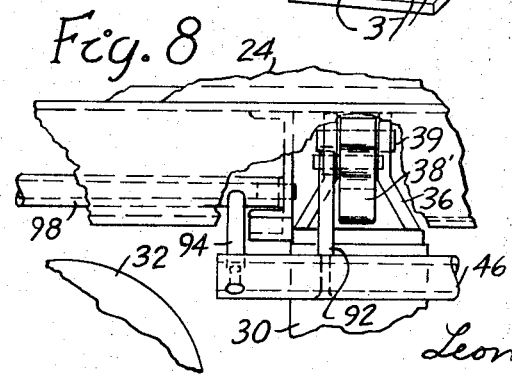
INVENTOR.
Leonard D. Barry Sept. 15, 1970   L. D. BARRY   3,528,569
UNIT LOAD HOLD-DOWN AND RELEASING LIFT
Filed May 22, 1967   3 Sheets-Sheet 2
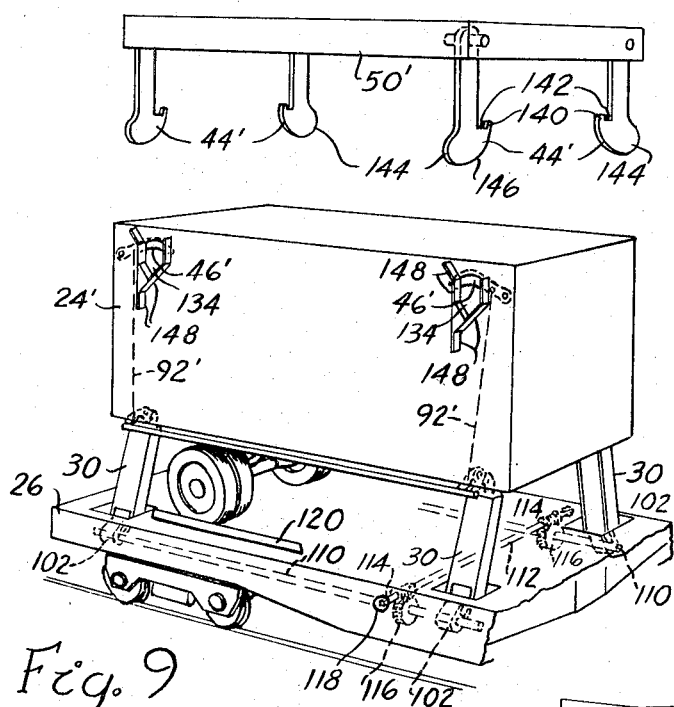
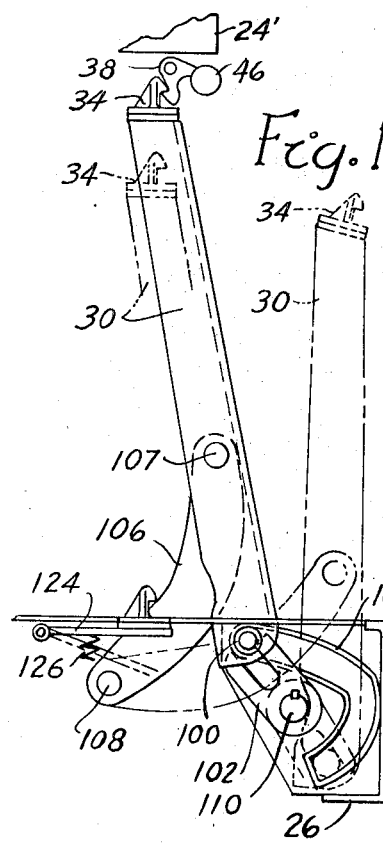
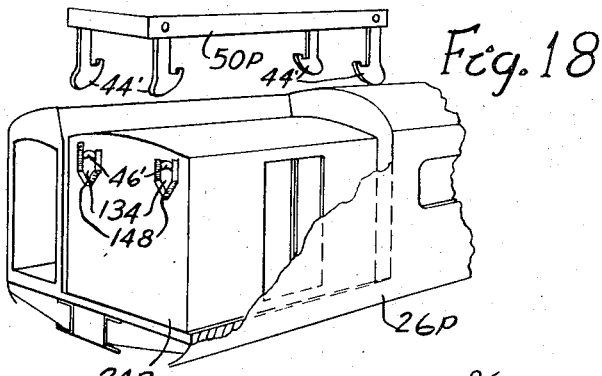
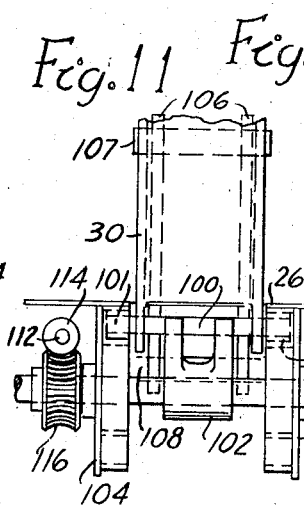
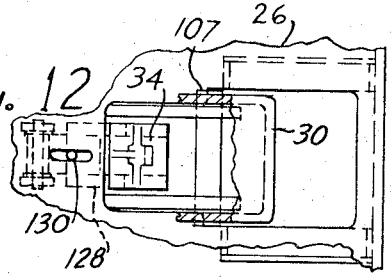
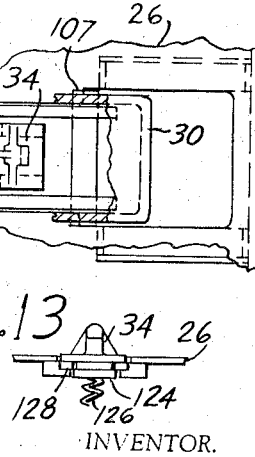
INVENTOR.
Leonard D. Barry Sept. 15, 1970    L. D. BARRY    3,528,569
UNIT LOAD HOLD-DOWN AND RELEASING LIFT
Filed May 22, 1967    3 Sheets-Sheet 3

INVENTOR.

Leonard D. Barry

United States Patent Office 3,528,569
Patented Sept. 15, 1970

1

3,528,569
UNIT LOAD HOLD-DOWN AND RELEASING LIFT
Leonard D. Barry, 19300 Pennington Drive,
Detroit, Mich. 48221
Continuation-in-part of application Ser. No. 591,369,
Oct. 14, 1966. This application May 22, 1967, Ser.
No. 640,131
Int. Cl. B65g 67/02
U.S. Cl. 214—38                                    7 Claims

ABSTRACT OF THE DISCLOSURE

This invention adapts railway flat cars or other vehicles to secure a semitrailer on pedestals or a cargo container either on or between the pedestals. Automatic locking latches on the pedestals secure the trailer when set down thereon. A lifting device releases latches and lifts the load from the pedestals. The pedestals support the trailer bed at height above the bed of the car for trailer wheels to be relieved of carrying weight of trailer. The latches can be opened and a crank shaft turned to lower the pedestals and move them to the side to set the trailer on the bed of the car for endwise (circus-type) loading and unloading of trailers and for setting cargo containers or other loads on locking devices between the pedestals.

---

This invention relates to means to hold down, release and transfer cargo pallets, containers, or vehicles to vehicles for transportation or for storage and in particular to means to automatically hook a load down and to automatically release it when engaged.

This is a continuation-in-part of FIGS. 108–111 of my pending application Ser. No. 591,369, filed Oct. 14, 1966, and further improves thereon.

It is an object to provide a quick and sure automatic hold down which locks the load in place when set thereon and which releases when engaged to lift the load therefrom.

It is an object to provide a hold down system for automatic, safe, and quick piggybacking of automobiles, trucks and trailers.

A feature of this invention is the provision of special latches and catches for connecting a container or vehicle onto a flat car to locate and latch down the container so that it cannot come off unless the latches are forced open as by special lifting hooks which engage under and lift the latches before lifting the container to remove from the vehicle or storage spot. These hold down devices are sure to be engaged whenever the equipped containers are set thereon, so that manual pinning and inspection of whether the container is secured are not necessary. This automatic latch down and release can be applied to secure a container, vehicle, or other load on a truck, trailer, railway car, boat, barge, or airplane or wherever it is desired to latch down one object onto another.

It is a further object to carry semitrailers on railway cars with the weight of the semitrailer or vehicle off its tires and wheels to reduce the possibility of tipping if a tire goes flat and to reduce the wear of the wheel bearings and tires from the vibration of the railway car causing movements of the semitrailer on its wheels.

It is a further object to provide pedestals for lifting each semitrailer or vehicle off the railway car bed or boat deck and for lowering the trailer and retractable to move out of the way so the trailers can be driven off and on the end of the container spot where overhead transfer means is not available. A related object is to provide two sets of catches for each container spot, one set on a foundation, floor, or deck and the other set on pedestals which can be moved over the lower catches for setting a trailer frame on the pedestals with room for the wheels below and

2 which pedestals move out to set a container down on the lower catches.

Another object is to provide a transfer device for releasing from hold downs, lifting, and supporting large containers or semitrailers along the bottom to reduce the structural requirements of the container over that required when lifting on the sides or top.

It is an alternative object to provide containers of both passenger and freight types with recessed lifting eyes near the top and hold downs released by lifting hooks in the eyes.

It is an object to provide automatic hold down devices on containers to secure containers one on top another in storage or on a transportation vehicle.

Other and further objects and features will be pointed out herein or should be evident upon consideration of this invention as described with reference to the drawings wherein:

FIGS. 1 and 2 are respectively side and end elevations of a railway car with retractable pedestals for either semitrailers or containers thereon and hoist for transferring the load to or from the pedestals.

FIGS. 3 and 4 are respectively end and side elevations of a latch down of FIGS. 1 and 2 to a larger scale supporting the container.

FIG. 5 is a perspective view of a lifting hook supporting a latch box over a catch, portions of FIGS. 1–4.

FIG. 6 is a schematic view of the hook opening mechanism of FIGS. 1 and 2.

FIGS. 7 and 8 are sectional elevations of a variation of the latch down assembly on respectively the end and side of the semitrailer or container of FIGS. 1 and 2.

FIG. 9 is a prespective view of half of a flat bed railway car with a semitrailer secured on the retractable pedestals of FIGS. 1 and 2 to show the pedestal operating mechanism and a simplified hook and latch control.

FIGS. 10 and 11 are respectively end and side elevations of the preferred retractable pedestal supporting a container on the car.

FIG. 12 is a top view of the lower portion of the pedestal and catch on the bed of the car.

FIG. 13 is an elevation in section taken on lines 13—13 of FIG. 12.

FIG. 14 is a perspective view of the latch operating details of FIG. 9.

FIG. 15 is a side elevation of a hook eye for operating the latch of FIG. 14.

FIG. 16 is a perspective view of a truck with a container latched thereon.

FIG. 17 is a side elevation of containers latched to each other and down on the deck of the railway platform car.

FIG. 18 is a perspective view of a container latched down in a passenger car with hook frame for releasing the container and lifting it.

Figure 19:
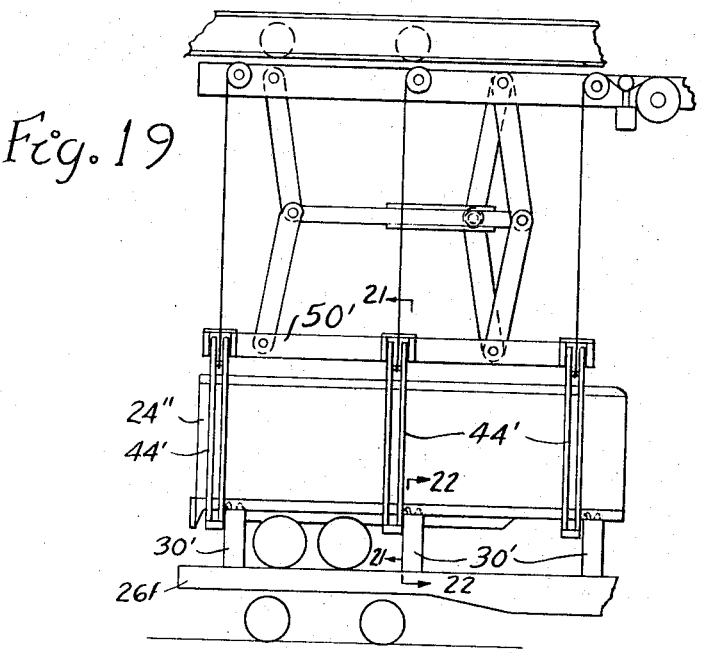
FIG. 19 is a side elevation of a carrier setting a container on an automatic locking pedestal-set on the railway car.
Figure 21:
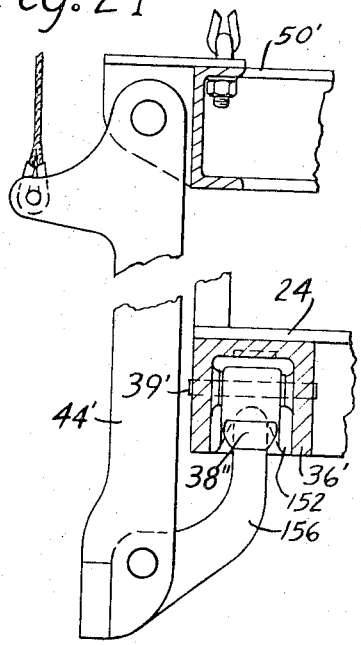
Figure 20:
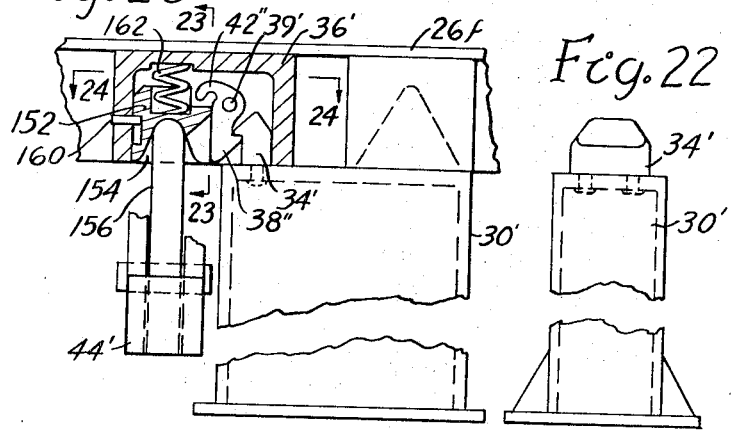
FIG. 20 is a cutaway enlargement of a portion of FIG. 19.
Figure 22:
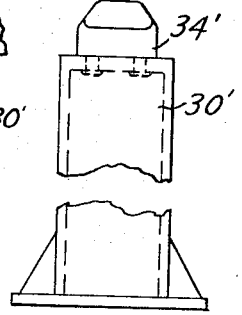

FIGS. 21 and 22 are respectively a section taken on lines 21—21 and a view of the pedestal taken on lines 22—22 of FIG. 19 to scale of FIG. 20.

Figure 23:
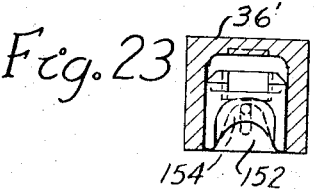
Figure 24:
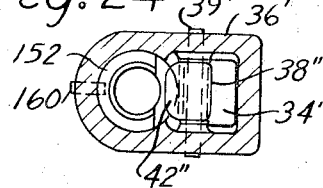

FIGS. 23 and 24 are sections taken respectively on lines 23—23 and 24—24 of FIG. 20.

Figure 25:
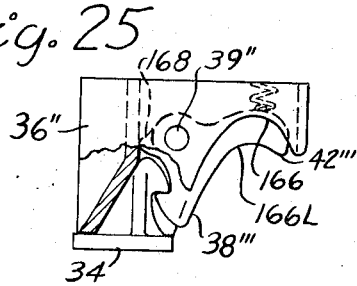
Figure 26:
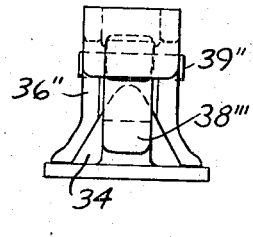

FIGS. 25 and 26 are respectively end and front views of another variation of the latch down assembly.

Figure 27:
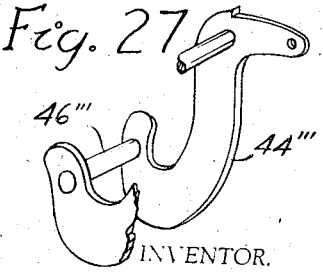

FIG. 27 is a perspective view of a hook for engaging the latch of FIGS. 25 and 26.

Referring to the drawings and in particular to FIGS. 1–6, a semitrailer or container 24 on a railway flat or platform car 26 is secured and supported on pedestals 30 at a height above the platform of car 26 to provide room for road wheels 32 on the semitrailer or other vehicle. The pedestals preferably each have an upstanding catch 34 faced out on each side of the car. Each catch 34 engages in a hole, foot, or latch box 36 secured along each side of the container to register with the catches 34. Tapered sides of box 36 and of catch 34 interfit to provide desired engagement tolerance and snug location horizontally both sidewise and endward on car 26. Gussets 37 on catch 34 provide this taper. A latch hook 38 is pivotally secured on pin 39 in each box 36 to engage its tooth 40 under tooth 41 on catch 34 preferably directly under pin 39. Teeth 40 and 41 wedge together as they close. Each latch 38 has an operating lever arm 42 which weights the lever closed (with aid of a spring if desired) and is opened by a lifting hook 44. Latches 38 on each side of the container are connected by a bar, preferably tube 46, secured directly on the end of levers 42 by screw 47 to swing therewith to open latches 38 when bar 46 is lifted by hooks 44.

Hook frame 50 straddles container 24 with two depending arms 52 on each side of the container. Each arm 52 has two channels 54 turned back to back and spaced apart and connected by cross members 55. Lifting hook 44 is pivotally secured to swing on pin 56 between channels 54 near the bottom thereof to swing under tube 46 to lift the tube to release latches 38 before tube 46 engages the bottom of the outer sill or rub rail of the trailer, lifting the container off catches 34.

Hooks 44 can be controlled to release a container only when set down. Hooks 44 can be controlled to release by any suitable means such as in FIGS. 46–49 of my pending application on Transportion System or as in my Pats. 3,164,406 or 3,208,789. A variation of that shown in my patent 3,257,142 is selected to be shown and described herewith, since this is of low cost, dependable, and useable for most applications hereof.

Referring to FIGS. 2 and 6, hook 44 has a notch or ratch 58 on its top engaged by vertical latch rod 60 to latch the hook open when swung up. A lever 62 pivoted at one end to hook frame 50 and engaging a roller 63 on its other end on top of the container is connected by lift rod 64 to swing hook 44 open when the hook frame is lowered below latching position of the hooks. Hooks 44 each have an opening arm 66 extending back from their pivot. Rod 64 has one end pivotally connected to this arm to extend up through loosely fitting U-bolt 67 on arm 62 and bent at height over top of arm 62 to be lifted by arm 62 to open hook 44 only when below latching position. Hooks 44 are latched open when arms 62 are raised to this height shown in phantom in FIG. 6.

Hooks 44 are released to swing under the container by lifting rod 60 with finger 68 on arm 62. Rod 60 is in the form of an inverted U guided in holes in cross members 55 between channels 54 to slide vertically to keep its top loop parallel the cross members. Finger 68 is pivotally secured on arm 62 to engage in this loop or under handle of rod 60 below the pivot of arm 62. A depending tab 70 on arm 62 has a horizontal hole in which finger 68 is mounted to swing vertically. Finger 68 is a rod bent around the edge of tab 70 facing the container and extends back under handle of rod 60 and is bent down at this end to insure that it will not catch on top of rod 60. When arm 62 is lifted from the position shown solid in FIG. 6 its finger 68 lifts rod 60, releasing hook 44 to swing closed under the container and releases rod 60 as finger 68 swings up and out from under the handle of rod 60. The bend of finger 68 around tab 70 pulls finger 68 out from under rod 60 as arm 62 swings up and holds the finger on the tab. When the hook yoke is lowered after dropping rods 60 arm 62 in FIG. 6 swings counterclockwise engaging the depending end of finger 68 against rod 60 swinging finger 68 back and down as shown in phantom to swing under the handle of rod 60 as arm 62 tilts down.

The hook frame 50 can be moved up and down by various means such as a dip transfer run as in FIG. 44 of my parent application or by any of various hoists. The preferred hoist 76 has a guide frame 78 on which the hook frame runs. Guide frame 78 has vertical channels 80 which fit in inner channels 54 of hook frame 50. Rollers can be provided to reduce friction if desired but are not considered to be needed. The hook frame 50 is aligned and preferably guided on a tab 82 extending out on a pedestal 30. Frame 50 has a bottom lengthwise member 84 preferably on each side and two depending angles 86 which sandwich tab 82 therebetween and are flared apart at the bottom to engage tab 82 for aligning the container on the pedestals. Vertical coupling as in my parent application can also serve this purpose; or, with the hooks 44 able to engage anywhere along tubes 46, this feature can be omitted and replaced by automatic or visual manual alignment control.

As seen in FIG. 5, hooks 44 are preferably built up from pairs of flame cut plates connected by a trough 90 to bear the load over a considerably area of tube 44 to prevent damage to the tube when lifting.

Rather than mount latch box 36 below the frame of trailer 24 it can be mounted within the frame as shown in FIGS. 7 and 8 with corresponding parts similarly numbered. Tube 46 is pivotally connected to levers 42 by rods 92 and to the frame by rods 94 to support the tube below the frame to open latches 38' when moved up against the frame. Holes at 96 are enlarged to provide movement between tube 46 and rods 92 and 94.

Where wheels 32 are too close to the frame of trailer 24 to run tube 46 over the wheels, a shaft 98 is pivoted to the frame and run behind wheels 32 and connected to a section of tube 46 by a rod 94 at each end of shaft 98 to carry the movement of tube 46 past wheels 32 to lift latch hooks 38 or 38' at the rear of the trailer.

Pedestals 30 on car 26 are preferably retractable as shown in FIGS. 2, 10 and 17 to open a passage for the semitrailer to be driven on and off the car in case there is no overhead transfer mechanism available at the loading or unloading spot. Pedestals 30 move straight down to phantom outline directly below the trailer, FIG. 10, and then out and down to the position shown in phantom in FIGS. 2, 10 and 17. They have a channel or boxed construction in section. The pedestals are pivotally supported at the bottom on a horizontal pin 100 parallel the side of the car. Pin 100 extends from each end of the pedestal to support a roller 101 on each end of the pin. The rollers 101 of each pedestal are moved along by a push arm 102 to each travel a cam track 104 of shape shown in FIG. 10 to lift and lower the pedestal as arm 102 is turned up or down respectively. The pedestal is braced upright by curved parallel arms 106 connected within on each side near the middle of the pedestal by pin 107 and connected on pin 108 to the frame of car 26 inward below the deck. The length and location of arm 106 and the cam track 104 is designed to give vertical movement to the catch until lowered below releasing from the trailer before it is swung open out from under the trailer by the contour of track 104 and the pivoting of the pedestal on pin 107. The actuating arms 102 for all pedestals on each side of a container spot are secured on a shaft 110. Arms 102 are preferably forked to straddle pin 100. The shaft 110 on one side of each container spot is connected to turn with the shaft 110 for the opposite side of that container spot to turn arms 102 similarly to guide the bottom of the pedestals similarly to equally lift or retract all the pedestals of the container spot together. This connection is preferably a transverse shaft 112 having a worm 114 secured on each end engaging a worm gear 116 secured on each parallel shaft 110 for that container spot. Shaft 112 has a socket 118 on each end at an opening in the side of the car for inserting a hand, air or electric cranking device to raise or retract the pedestals of that container spot. The pedestals for adjacent container spots being similarly connected can be actuated separately at substantially the same rate for long containers taking more than one container spot, or clutches can connect adjacent lengths of shafting 110 to raise and lower pedestals of more than one container spot together.

OPERATION OF RETRACTABLE PEDESTAL

When a trailer is received on pedestals where no overhead facilities are available to lift off the trailer, the landing gear is lowered to parking length, tubes 46 propped up with a bar or board on each side to open latches 38, the pedestals cranked down, depositing the trailer on the bed of car 26 and swinging to the sides out of the way. The catch 34 on top of each pedestal has a locus of motion to lower substantially straight down (about six inches) with a slight tolerable rock or so as not to catch on latch 38 or to bind in the latch box 36. When the pedestals are lowered and opened out as in phantom in FIG. 2 there is ample clearance for the trailer to be driven on or off. Guide curbs 120 are preferably provided on car 26 to prevent the vehicles thereon from colliding with the opened pedestals. A trailer can be driven on car 26 using a ramp, stopped in alignment for latching, a cranking device inserted in a socket 118 and operated to raise arms 102, placing pedestals 30 under the trailer and lifting them up together to engage catches 34 with latches 38 and thereafter lifting the trailer slightly, relieving the trailer wheels of the load and wedging arm 102 against the cam pin 100 at the upper end of tracks 104 to block the cam wheels tight. A relief clutch on the cranking device or at each socket 112 preferably protects pedestal elevating parts from damage when jamming cam rollers 101 at ends of travel. The pedestals are held tightly and securely by this elevating device to secure the trailer or container tightly and safely for shipment.

Additional catches 34 can be secured and positioned on the deck of a car or boat to recess into holes therein as shown in FIGS. 10–13 to secure the containers to the platform or deck rather than on pedestals if only containers without wheels are to be hauled. Car 26 has catches both on pedestals and directly beneath on the floor. This is possible since the pedestals slant from sides inward over the catches on the floor and retract and swing out to enable use of the catches on the floor.

Catches 34 are mounted to recess below the deck to enable trailers to be driven on and off or to use the deck for other loads. Each lower catch 34 is secured on top of one end of a horizontal arm 124 pivoted at its opposite end below the floor to the frame of the car or boat to swing up through a hole in the floor by force of spring 126 under the catch. Each catch is latched up at floor level by a horizontal plate 128 mounted to slide under the catch with pin 130.

It should be obvious that the retractable pedestals are applicable to boat decks, barges, and storage spots to lock down either a container on the lower catches or a trailer or vehicle on the pedestals when swung over the lower catches. Automobiles can also be equipped as trailer 24 but with smaller latch boxes 36 and lift bars 46 for hooks 44. Rollers 63 would be rubber covered and the hook frame sized for the load.

SOME VARIATIONS

This latch down system can have many variations and applications a few of which will be described.

The latches 38 can be connected to lift hooks or operating levers in various places on the container. By engaging the lift hooks near the top of the container the movement of the hook frame and transfer time is reduced.

Referring to FIG. 9, hook frame 50' supported on hoist or other means to lower and raise to engage or disengage the container has hooks 44' pivotally secured thereabout to engage in openings or eyes 134 in the container. The eyes have lids 46' preferably between inner and outer walls of the container and each covering the top portion of the opening to be lifted by a hook 44' and connected by rod 92' to operate lever 42 on latches 38 to release the container from catches 34 before it is lifted by hooks 44'. Hooks 44' each have a front tooth 140 with a flat saddle 142 for latching under lid 46' and into hole 134 for supporting the container, a lobe 144 opposite the tooth to bias the hook to swing forward to insert by gravity into hole 134, a lower cam face 146 sloping down from the tooth to release the hook on the bottom of hole 134 when lowered. Each eye 134 is bordered and reinforced on sides and bottom by a flat cam strip 148 or angle run vertically on each side outside the eye and bent down at an angle from both sides of the hole to the bottom and on one side (the same for all eyes on the container) the strip continues down at the angle to the other side of the eye and this is bent straight down aways as shown. Cam strips 148 open hooks 44' when lifted after being lowered until the hooks cam out of holes 134 and their teeth catch under strips 148 which guide them from reentering the holes.

Containers 24' can be latched onto truck beds having catches 34 secured thereto, FIG. 16. Containers 24' can have catches 34 secured on top for stacking on a railway car 26, FIG. 17, or in boat holes or to decks and for stacking in storage on catches 34 secured to sills, a slab piles, etc. for supporting containers in open storage against moderate to high winds.

Containers for passenger or enclosed cars 26P, FIG. 18, would have the eyes 134 at the ends of the container because of the limited side clearance between the container and the walls of the car. Hooks 44' are mounted in frame 50P to engage the passenger type container 24P.

Referring to FIG. 15 the eye can be in the lid, one piece 46", on top of the container to lift rod 92' to release the latches before lifting the container.

Referring to the variation shown in FIGS. 19–24, the semitrailer 24" is locked down on stationary pedestals 30' on car 26f with catches or locking pins 34' which insert in housing 36' tapered to receive the pin. Latch hook 38" is pivotally secured in housing 36' on pin 39' between walls thereof to swing against pin 34' and latch therewith. A keeper block 152 slides up and down in the housing against hook 38" opposite pin 34' to keep the hook engaged with pin 34'. Bock 152 has a bottom pocket 154 into which an up-pointing finger 156 of hook 44" engages to lift the block. Latch 38" has an arm 42" extending over block 152 engaged by the block when pushed up to pivot hook 38" on pin 39' to release pin 34' as hooks 44" lift the load off pedestals 30'. Outward travel of block 152 is limited by pin 160. The latch hooks remain open until the load is set down. Spring 162 aids gravity in lowering block 152 and so aids in latching hook 38". Block 152 is relieved for latch 38" to swing therein only when block 152 is lifted, and prevents the release of the latch 38" when block 152 is down. Pedestals 30' elevate the load to provide room for the wheels of semitrailers above the floor and can be made to lower or remove for other loading on vehicle 26f.

Referring to FIGS. 25–27 for another variation of the latch down, catch 34 can be engaged by latch hook 38''' pivotally housed in box 36" on pin 39" and lifted by hook engaging its lever arm 42'''. The lift hook 44''' has a shaft or tube 46''' connected between plates 44''' which are flared out on hooking end to engage under lever 42''' on latch 38''' and under a curved depression 166 in each side of box 36" between which sides lever 38''' recesses so that box 36" carries the load on hook 44''' and so hook 44" cannot slip out under load. Latch 38''' has a corresponding depression 166L on its opening lever to prevent hook 44''' slipping off. Latch 38''' has a frontal lobe 168 which engages box 36" to hold the latch from swinging closed too much to be engaged if not set on a catch 34. Lever 42''' is preferably vertically thick enough to remain between the walls of box 36" when latched.

In all except FIGS. 19–24 the lifting hook directly operates the latch hook without using a keeper block. The keeper is not needed with correct design of the latch. With catches mounted facing oppositely on both sides of the car the tapered walls of the box lock the load in all horizontal directions. The engaging faces on the catch and latch are preferably curved to the radius from pivot but on different centers to cause wedging. The pivot is preferably directly above the latching faces to insure that they will not open no matter how hard the upward pull on the catch. With this design this pull helps to hold the latch closed. A spring can be pocketed between the top of lever 42 and box 36 or the container frame (coil spring) to help insure operation of latches 38 which are latched by gravity.

Having thus described a few of many possible variations and applications of this invention it is understood that all latches on a container can be released by one lifting hook or each lifting hook release all latches as by mechanical or hydraulic linkage between latches or between one or more eyelids and all the latches. Rods 92 can be connected to lift tube 46, FIG. 9, and latches on opposite sides of the container can be connected by lever linkage. Further modifications and applications should be obvious to those skilled in the arts without departing from the spirit of this invention, and I therefore desire to cover by the appended claims all ambodiments which come within the true spirit and development of this invention.

I claim as my invention:

1. An automatic latch down and lift and releasing mechanism for temporarily securing an object to a support and which comprises a plurality of catches secured in spaced relation to the support, a plurality of latches pivotally secured about the bottom of said object to each align and swing on a horizontal axis to engage a said catch, lever means for opening said catches, aligning means for holding said latches horizontally aligned with said catches, vertical lifting means for engaging and lifting said lever means to release first and then lift and suspend said object, and means for releasing said lift means from said object when set down.

2. In combination, a unit load, catches spaced and supported for supporting said load, latches spaced and secured on the bottom of said load for engaging said catches and securing the load thereto, a lifting frame, hook means depending from said frame to engage and support the load, lever means on said load for engagement by said hook means to open said latches as said frame is lifted just before lifting said load, cam and latching control means for holding said hook means open when said load is set down so said hook means can release from the load.

3. In a combination as in claim 2, said hook means engaging said lever means on the bottom of the load, pedestals for supporting said catches for supporting the load at a height for engaging said hooks under the load, a rail along the bottom of each side of the load and pivot arms mounting the rails to the load to lift said latches with said hooks engaging under said rails, said rails distributing the load along the bottom of the load and enabling hooking anywhere therealong.

4. In a combination as in claim 3 said arms being lever arms on said latches.

5. In a combination as in claim 2 said load having a bottom frame, said latches and catches being within the bottom frame of the load.

6. In combination, a unit load, a frame for suspending the load, means for raising and lowering said frame, latch downs spaced on the bottom of the load along the sides, side members extending down from opposite sides of the frame to straddle the load, hooks on the bottom of said side members for engaging the latch downs to open and lift the load, and cam means for controlling the hooks to release the load when set down, pedestals each having a catch for engaging with a said latch down to locate and secure the load and a lever on each latch down lifted by said hook to open said latch down before lifting the load.

7. A latch down as in claim 1, said lifting means comprising hooks and means pivotally suspending said hooks to swing in vertical planes, said hooks being faced inward on said lifting means to engage openings in said object, each said opening having an eye lid connected on said object to raise and lower over the upper portion of said opening to be lifted by a said hook when engaged thereunder and lifted, and means connecting said lid to said latch to open when said lid is raised.

References Cited

UNITED STATES PATENTS

| | | | |
|---|---|---|---|
| 2,053,969 | 9/1936 | Olds | 105—366 |
| 2,424,429 | 7/1947 | Bamberg. | |
| 2,812,974 | 11/1957 | McHugh | 105—366 |
| 2,898,872 | 8/1959 | Hastings | 105—366 |

ROBERT G. SHERIDAN, Primary Examiner

U.S. Cl. X.R.

214—658; 105—366; 294—83